(12) United States Patent
Manchiraju et al.

(10) Patent No.: US 10,810,115 B2
(45) Date of Patent: Oct. 20, 2020

(54) SYSTEMS AND METHODS USING ARTIFICIAL INTELLIGENCE TO IDENTIFY, TEST, AND VERIFY SYSTEM MODIFICATIONS

(71) Applicant: Verizon Patent and Licensing Inc., Arlington, VA (US)

(72) Inventors: Nagaraju Manchiraju, Bridgewater, NJ (US); Ravi K. Kotyala, Edison, NJ (US); Satya V. Nemana, East Windsor, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 69 days.

(21) Appl. No.: 15/850,532

(22) Filed: Dec. 21, 2017

(65) Prior Publication Data
US 2019/0196952 A1 Jun. 27, 2019

(51) Int. Cl.
| | | |
|---|---|---|
| G06F 9/44 | (2018.01) | |
| G06F 11/36 | (2006.01) | |
| G06N 3/08 | (2006.01) | |
| G06F 8/71 | (2018.01) | |
| G06F 8/65 | (2018.01) | |

(52) U.S. Cl.
CPC ............ *G06F 11/3696* (2013.01); *G06F 8/65* (2013.01); *G06F 8/71* (2013.01); *G06F 11/368* (2013.01); *G06F 11/3676* (2013.01); *G06F 11/3688* (2013.01); *G06N 3/08* (2013.01)

(58) Field of Classification Search
CPC .......... G06F 8/65; G06F 8/71; G06F 11/3696; G06F 11/3676; G06F 11/3688
See application file for complete search history.

(56) References Cited

U.S. PATENT DOCUMENTS

| | | | | |
|---|---|---|---|---|
| 5,487,169 A | * | 1/1996 | Vraney | ..................... G06F 8/30 |
| | | | | 717/117 |
| 5,673,387 A | * | 9/1997 | Chen | ................... G06F 11/3676 |
| | | | | 707/999.202 |

(Continued)

OTHER PUBLICATIONS

Title: Automatic Selection of Test Cases for Regression Testing , author: Cláudio Magalhães et al, source: ACM, dated: Sep. 2016.*

(Continued)

*Primary Examiner* — Chameli Das

(57) ABSTRACT

A computer device may include a memory configured to store instructions and a processor configured to execute the instructions to identify changes in source code of an application; generate a plurality of source code keywords based on the identified changes in the source code; and map the generated plurality of source code keywords to a plurality of testing keywords. The processor may be further configured to identify a plurality of test cases from a test cases database based on the plurality of testing keywords and inject the plurality of test cases into a testing queue of a testing system associated with the application. The computer device may further determine that the injected plurality of test cases sufficiently tested the changes in the source code and, based on the determining, update a deployed instance of the application to include the changes in the source code.

20 Claims, 10 Drawing Sheets

(56) References Cited

U.S. PATENT DOCUMENTS

| | | | | |
|---|---|---|---|---|
| 6,536,036 B1* | 3/2003 | Pavela | G06F 11/3676 |
| | | | 707/999.104 |
| 6,907,546 B1* | 6/2005 | Haswell | G06F 11/3684 |
| | | | 714/38.11 |
| 9,043,759 B1* | 5/2015 | Lininger | G06F 11/3684 |
| | | | 717/106 |
| 9,606,900 B1* | 3/2017 | Pradhan | G06F 16/148 |
| 2005/0166094 A1* | 7/2005 | Blackwell | G06F 11/3664 |
| | | | 714/38.14 |
| 2005/0257267 A1* | 11/2005 | Williams | H04L 63/0227 |
| | | | 726/25 |
| 2008/0148247 A1* | 6/2008 | Galler | G06F 11/3684 |
| | | | 717/154 |
| 2008/0244524 A1* | 10/2008 | Kelso | G06F 11/3664 |
| | | | 717/124 |
| 2009/0217303 A1* | 8/2009 | Grechanik | G06F 8/38 |
| | | | 719/320 |
| 2013/0159233 A1* | 6/2013 | Mason | G06N 5/00 |
| | | | 706/45 |
| 2015/0082277 A1* | 3/2015 | Champlin-Scharff | |
| | | | G06F 9/454 |
| | | | 717/120 |
| 2015/0254173 A1* | 9/2015 | Gupta | G06F 11/3688 |
| | | | 714/38.1 |
| 2016/0034382 A1* | 2/2016 | Kumar | G06F 11/3676 |
| | | | 717/124 |
| 2016/0328315 A1* | 11/2016 | Rajamanickam | G06F 11/3676 |
| 2017/0132113 A1* | 5/2017 | Krishna | G06F 11/3688 |
| 2017/0212829 A1* | 7/2017 | Bales | G06F 11/3612 |
| 2019/0079856 A1* | 3/2019 | Ellis | G06F 11/3684 |
| 2019/0102695 A1* | 4/2019 | Biswas | G05B 13/029 |

OTHER PUBLICATIONS

Title: Model Based search for combiatorial optimization: A critical Summary; author: Mark Zlochin, published on 2004.*
Title: A neural network approach to improve the lossless image compression ratio author: V Mehare et al, published on 2012.*

* cited by examiner

SYSTEMS AND METHODS USING ARTIFICIAL INTELLIGENCE TO IDENTIFY, TEST, AND VERIFY SYSTEM MODIFICATIONS

BACKGROUND INFORMATION

An application development process may include a planning process to determine the requirements of a software application or system, a design and source code development process, and a testing process to validate and verify that an application and/or software system is functioning properly. Furthermore, after an application and/or software system is deployed, modifications to the source code may need to be performed to add, update, and/or remove particular functions and/or to correct defects (i.e., "software bugs"). After any modifications, testing may need to be performed to determine whether the application and/or software system satisfies particular requirements, such as performance, usability, and/or security requirements. Such testing may consume significant resources of a computer system hosting the application, software system, and/or testing system used to perform the testing.

DETAILED DESCRIPTION OF PREFERRED EMBODIMENTS

Figure 1:
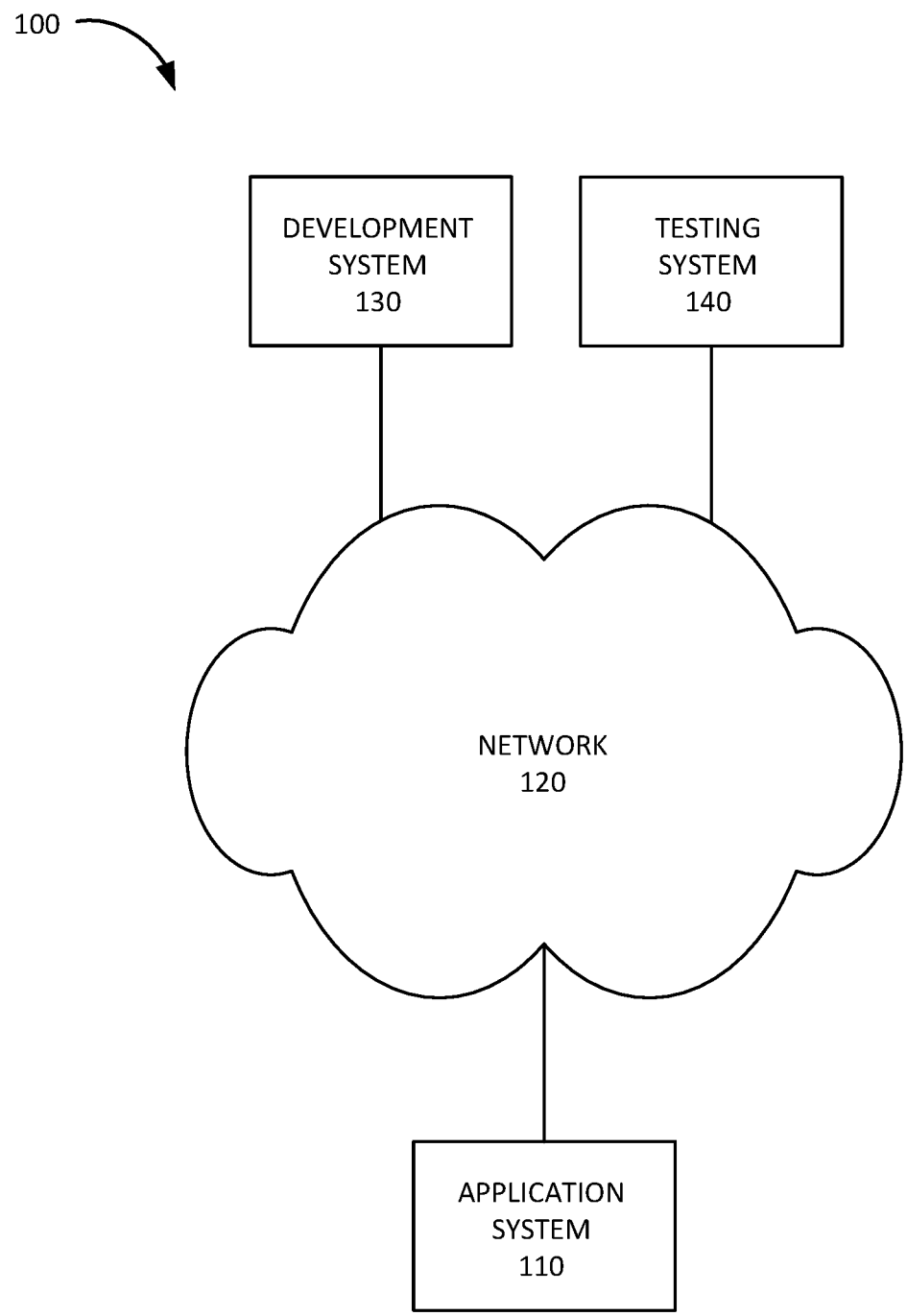
FIG. 1 is a diagram illustrating an environment according to an implementation described herein.

The following detailed description refers to the accompanying drawings. The same reference numbers in different drawings identify the same or similar elements.

Applications, and/or types of software systems may be maintained using a software development system. Particular types of applications may be large and complicated, and may require frequent updates to fix detected software bugs or to add, change, and/or remove particular functionality. Even a small change in an application, such as changing a single line of source code, may result in negative performance. Therefore, a testing system may perform quality assurance regression tests to determine that an application is functioning properly after a particular change in the source code. At any particular time, there may be a large number (e.g., hundreds, etc.) of changes to a particular application being built that need to be tested before deployment. Furthermore, the testing system may include a large number (e.g., thousands, etc.) of test cases associated with a particular application. Each test case may apply a particular set of packages, functions, interfaces, conditions, inputs, and/or other types of parameters with respect to the particular application.

In order to satisfactorily perform quality assurance testing, all appropriate test cases may need to be run in response to a change in the source code of an application. This may result in all test cases associated with an application being tested, which may include running test cases that are not relevant to the change. Running test cases that are not relevant wastes time and processing resources of the testing system and may unnecessarily delay deployment of a new build of an application. However, identifying test cases relevant to a particular source code change may be difficult. For example, changes in one portion of the code may have an unwanted impact on a completely unrelated area of code.

Implementations described herein relate to systems and methods for artificial intelligence (AI) injection of test cases. An AI smart engine may be configured to perform auto-filtering and auto-injection of test cases based on source code changes and to update the auto-filtering and auto-injection of test cases based on code coverage information obtained as a result of the auto-injected test cases. For example, a smart engine, implemented on a computer device, may identify changes in the source code of an application, generate source code change keywords (also referred to herein as "source code keywords") based on the identified changes in the source code, and map the generated source code change keywords to the appropriate test cases. The smart engine may then identify relevant test cases based on the testing keywords and select/inject the identified test cases into a testing queue of a testing system associated with the application.

Thus, the source code change keywords may include any keywords extracted from source code changes between a previous source code file and an updated source code file with proposed changes to the source code. The source code change keywords may be generated based on the source code changes, and may be extracted from a comment associated with the source code changes, a file name associated with the source code changes, a variable name associated with the source code changes, a function associated with the source code changes, and/or other types of keywords or phrases that may be extracted out of the source code.

Mapping of the changes to the appropriate test cases may be performed using AI tools, such as machine learning. In some implementations, mapping the source code changes to the testing keywords may be performed using one or more neural networks. For example, an encoding neural network may be trained to encode a set of source code keywords into an encoded keywords vector using an encoding neural network and a decoding neural network may be trained to decode the encoded keywords vector into a set of testing keywords. When a new source code keyword or a new testing keyword is selected to be added to the mapping, the neural networks may be retrained to incorporate the new keyword. For example a new source code keyword may be identified, the encoding neural network may be retrained using the new source code keyword, and the decoding neural network may be retrained using the retrained encoding neural network.

Furthermore, in identifying relevant test cases, the smart engine may identify additional test cases based on identified relevant test cases, using a dependency matrix. The dependency matrix may identify test cases that need to be injected based on other test cases that are being run for a particular test. For example, if a particular function in the source code is being tested using a first test case, and the particular function calls another function, the dependency matrix may identify a second test case that is associated with the other function. The dependency matrix may be updated after each test run based on code coverage results obtained from the test run.

The smart engine may obtain code coverage information for the changes in the source code associated with the injected test cases and may determine whether the obtained code coverage information satisfies a code coverage criterion. The code coverage information, obtained using a code coverage tool, may identify, for example, what percentage of instructions, source code lines, instruction branches, methods, method complexity, classes or other objects, etc., in the source code changes was tested via the injected test cases. The smart engine may perform various updates based on the obtained code coverage information. For example, the smart engine may determine that the obtained code coverage information does not satisfy the code coverage criterion and update the identified test cases, based on determining that the obtained code coverage information does not satisfy the code coverage criterion.

In some implementations, the smart engine may identify untested changes in the source code based on the obtained code coverage information, identify a new source code keyword based on the untested changes in the source code of the application, generate an updated list of source code keywords that includes the new source code keyword, map the updated list of source code keywords to an updated list of testing keywords, select one or more additional test cases based on the updated list of testing keywords, and inject the selected one or more additional test cases into the testing queue.

In some implementations, the smart engine may identify untested changes in the source code based on the obtained code coverage information, select one or more additional test cases associated with the untested changed by accessing a testing history database, and inject the selected one or more additional test cases into the testing queue. In some implementations, the smart engine may alert an administrator that the obtained code coverage information does not satisfy the code coverage criteria receive one or more additional test cases associated with changes in the source code from the administrator, inject the received one or more additional test cases into the testing queue; and update a translation engine that maps code keywords to testing keywords based on the received one or more additional test cases.

In some implementations, the smart engine may identify a new code keyword based on the obtained code coverage information, generate an updated list of source code keywords based on the identified new code keyword, map the updated list of source code keywords to an updated list of testing keywords, identify one or more additional test cases based on the updated list of testing keywords, and update a dependency matrix in a test cases database based on the identified one or more additional test cases.

After the smart engine determines that the injected test cases sufficiently tested the changes in the source code based on, for example, the obtained code coverage information satisfying a code coverage criterion, the source code changes may be approved for deployment and an application system that hosts the application may receive an update that includes the source code changes. For example, a deployed instance of the application may be updated to include the changes in the source code, based on determining that the injected test cases sufficiently tested the changes in the source code.

Identifying relevant test cases by mapping source code keywords to testing keywords and automatically injecting the identified relevant test cases into the testing queue significantly improves quality assurance efficiency by speeding up testing and conserving computing resources. Determining code coverage information and updating the selection of relevant test cases further improves the testing process by reducing the amount of time and use of computing resources to obtain sufficient code coverage and approve source code changes for deployment. For example, for every Software Development Life Cycle (SDLC) that results in an application update, such as a Change Control (CC) update or an Enterprise Release (ER) update, expensive resources, such as processor, memory, storage, and/or network bandwidth of a cloud computing center may be consumed for running each test case. Speeding up the testing process, by avoiding unnecessary execution of test cases, reduces the processor time, memory use, storage, and/or network bandwidth consumed during the testing process.

Moreover, speeding up the testing process results in updating a deployed instance of the application faster, which may further conserve resources in a system hosting the deployed instance of the application by reducing potential downtime from existing bugs in the application, by making processor and memory use more efficient, by improving use of network bandwidth by the application, and/or other improvements in the functioning of the application as a result of the update.

FIG. 1 is a diagram of an exemplary environment 100 in which systems and/or methods, described herein, may be implemented. As shown in FIG. 1, environment 100 may include an application system 110, a network 120, a development system 130, and a testing system 140.

Application system 110 may include one or more devices, such as computer devices and/or server devices, which may host an application, and/or another type of software system, associated with a provider of communication services. Examples of such applications may include retail point-of-sale applications used to purchase wireless communication devices and/or subscription plans associated with wireless communication device, web sites hosting a store front for purchases associated wireless communication devices and/or service plans, customer service applications used by customer service representatives to assist customers of a provider of communication services, account management applications used to manage customer accounts, network management applications used to manage network devices in a communication network, network provisioning applications used to provision network devices and/or services in the communication network, a user device application, an application used by an Internet of Things (IoT) device, and/or other types of applications associated with a provider of communication services.

In some implementations, application system 110 may include a handheld wireless communication device (e.g., a mobile phone, a smart phone, a tablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface. In other implementations, application system 110 may include an IoT computer device enabled with wireless communication functionality and employing machine-to-machine (M2M) communication, such as, for example, Machine-Type Communication (MTC), a type of M2M communication standard developed by the $3^{rd}$ Generation Partnership Project (3GPP). Examples of such M2M devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), an unmanned aerial drone vehicle or aircraft system, and/or another type of electronic device. Source code for the application hosted by application system 110 may be developed by development system 130 and provided to application system 110 via network 120.

Network 120 may correspond to a network managed by the provider of communication services. Network 120 may include a local area network (LAN), a wide area network (WAN), a metropolitan area network (MAN), an optical network, a cable television network, a satellite network, a wireless network (e.g., a Long Term Evolution (LTE) network, a Code Division Multiple Access (CDMA) network, a general packet radio service (GPRS) network, etc.), an ad hoc network, a telephone network (e.g., the Public Switched Telephone Network (PSTN) or a cellular network), an intranet, the Internet, or a combination of networks. In some implementations, network 120 may include an Internet Protocol Multimedia Sub-system (IMS) network (not shown in FIG. 1). An IMS network may include a network for delivering IP multimedia services as specified by 3GPP and may provide media flows between user devices and external IP networks or external circuit-switched networks (not shown in FIG. 1).

Development system 130 may include one or more devices, such as computer devices and/or server devices, which may host a software development system, such as an integrated development environment (IDE) that includes source code editors, build automation tools, debuggers, and/or other software development tools. Development system 130 may develop source code for application system 110 and provide the source code to testing system 140 for testing.

Testing system 140 may include one or more devices, such as computer devices and/or server devices, which test applications associated with application system 110. For example, testing system 140 may maintain a simulated environment for application system 110 and may test source code associated with application system 110 obtained from development system 130 using test cases designed to test particular functions, interfaces, conditions, inputs, and/or other types of parameters that may be associated with application system 110. Testing system 140 may select relevant test cases based on source code changes obtained from development system 130, may automatically inject the selected test cases into a testing queue, and may update the relevant test cases based on code coverage information obtained as a result of the auto-injected test cases.

Although environment 100 includes a single application system 110 a single development system 130, and a single testing system 140, for illustrative purposes, in practice, environment 100 may include multiple application systems 110, multiple development systems 130, and/or multiple testing systems 140.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100. For example, in some implementations, development system 130 may include, or perform the functions of, testing system 140.

Figure 2:
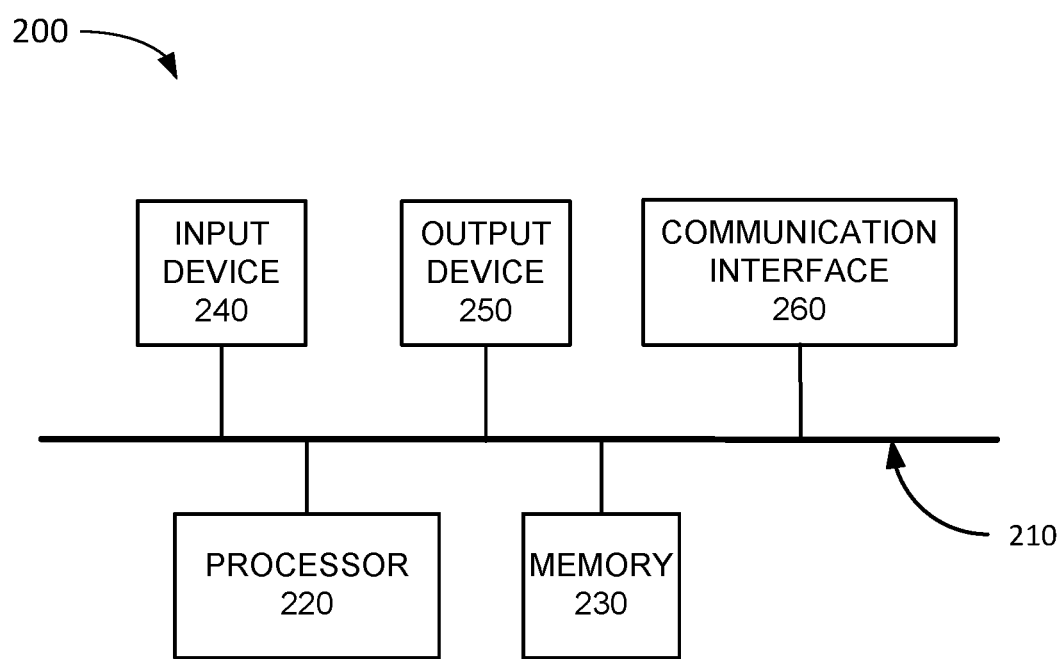
FIG. 2 is a diagram illustrating exemplary components of a device that may be included in a device or system of FIG. 1.

FIG. 2 is a diagram illustrating exemplary components of device 200 according to an implementation described herein. Application system 110, development system 130, and/or testing system 140 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. For example, processor 220 may include one or more Central Processing Units (CPUs) and/or one or more Graphics Processing Units (GPU). In other embodiments, processor 220 may include an application-specific integrated circuit (ASIC), a field-programmable gate array (FPGA), and/or another type of integrated circuit or processing logic. Processor 220 may control operation of device 200 and its components.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200 and/or to collect information from the environment using one or more sensors. Input device 240 may include, for example, buttons (e.g., a keyboard, keys of a keypad, control buttons, etc.), a mouse, a pen, a joystick, a tracking pad, a stylus, a remote control, a microphone or another audio capture device, an image and/or video capture device (e.g., a camera), a touch-screen display, a light sensor, a gyroscope, an accelerometer, a proximity sensor, a temperature sensor, a barometer, a compass, a health sensor (e.g., pulse rate monitor, etc.), and/or another type of input device. In some implementations, device 200 may be managed remotely and may not include input device 240. In other words, device 200 may be "headless" and may not include a keyboard, for example.

Output device 250 may output information to an operator of device 200 and/or to control device 200 and/or the environment using one or more actuators. Output device 250 may include a display, a printer, a speaker, an illumination source (e.g., a camera flash), an actuator to cause device 200 to vibrate, a motor to cause part of device 200 to move, a lock device, and/or another type of output device. For example, device 200 may include a display, which may include a liquid-crystal display (LCD), a light emitting diode (LED) display, an organic LED (OLED) display, an electrophoretic (e.g., electronic ink) display, and/or another type of display device for displaying content to a user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface or an interface for another type of short range (e.g., less than 100 meters) wireless communication method, a radio-frequency identification (RFID) interface, a near-field communications (NFC) wireless interface, a Global Positioning System (GPS) receiver to obtain location information from GPS satellites, an optical transceiver, and/or any other type of interface that converts data from one form to another form.

As will be described in detail below, device 200 may perform certain operations relating to artificial intelligence injection of test cases. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
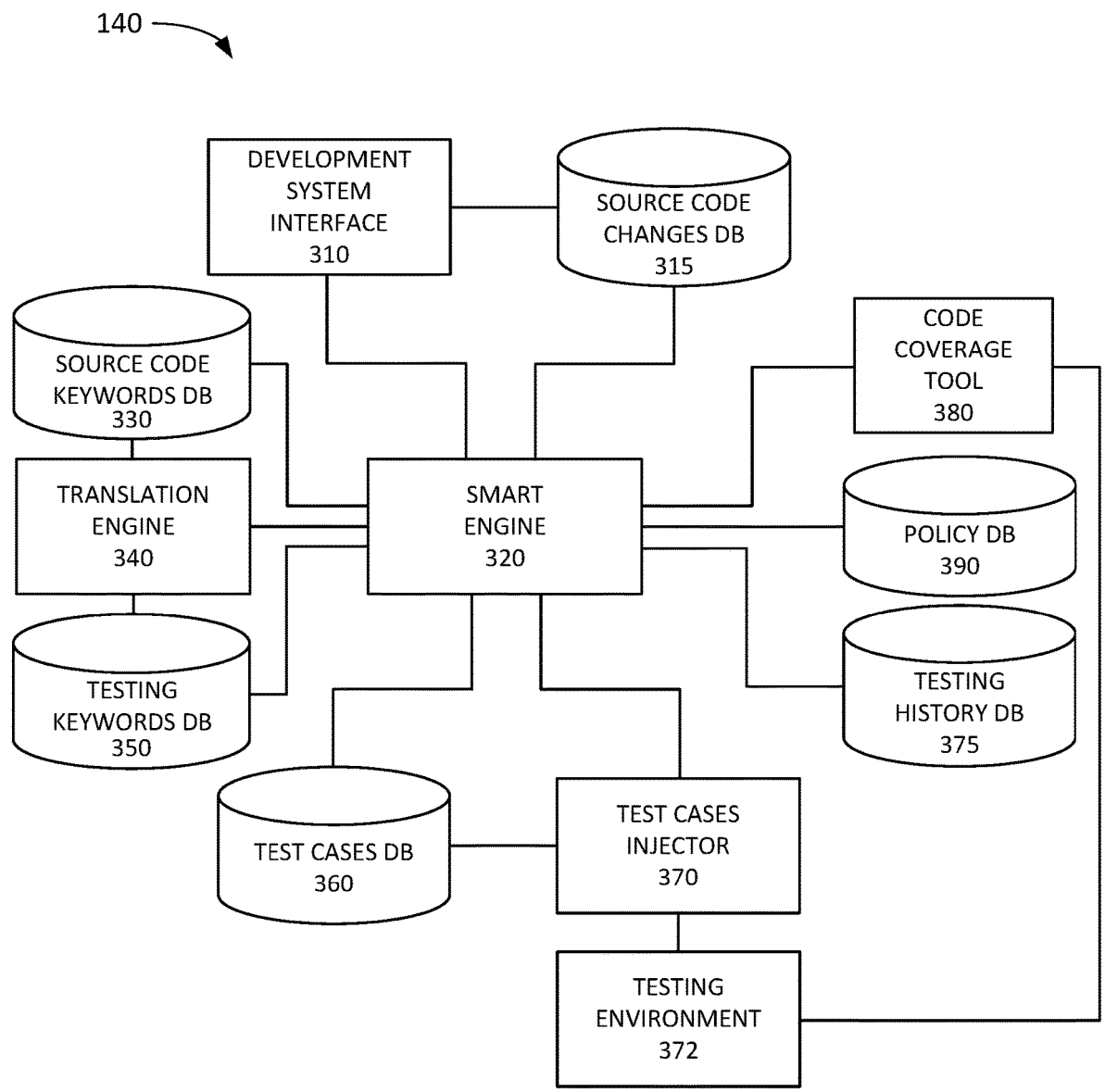
FIG. 3 is a diagram illustrating exemplary functional components of the testing system of FIG. 1.

FIG. 3 is a diagram illustrating exemplary functional components of testing system 140. The functional components of testing system 140 may be implemented, for example, via processor 220 executing instructions from memory 230. Alternatively, some or all of the functional components included in testing system 140 may be implemented via hard-wired circuitry. As shown in FIG. 3, testing system 140 may include a development system interface 310, a source code changes database (DB) 315, a smart engine 320, a source code keywords DB 330, a translation engine 340, a testing keywords DB 350, a test cases DB 360, a test cases injector 370, a testing environment 372, a testing history DB 375, a code coverage tool 380, and a policy DB 390.

Development system interface 310 may be configured to communicate with development system 130. Development system interface 310 may receive, from development system 130, information identifying source code changes associated with development system 130 for a particular application associated with application system 110. For example, development system interface 130 may receive information identifying source code changes for the particular application each time a change is made by development system 130, at particular time intervals, based on a request for changes made by testing system 140, and/or based on other criteria. Source code changes DB 315 may store source code changes received from development system 130 via development system interface 310 for the particular application.

Smart engine 320 may extract source code keywords from source code changes stored in source code changes DB 315. Smart engine 320 may extract source code keywords from comments, file names, variable names, function names, and/or other types of entities associated with the source code changes. Some examples of source code keywords include "E911," "Credit Card," and "Gift Card." Source code keywords may be identified by scanning the source code difference files (e.g., files generated from a previous source code file and a source code file with proposed changes) and mapping the source code difference files into the corresponding function names, package names, and/or file names in the source code directory. In every release, some files may be modified by the developers and smart engine 320 may identify the source code keywords by scanning and parsing the source code changes using programmatic techniques, such as entity recognition techniques. For example, an ML engine may be trained to recognize terms that appear multiple times in a section of source code, capitalized terms, terms that are included in a named entity corpora associated with application system 110, terms that are included in a language dictionary (e.g., English dictionary, etc.), and/or other types of terms.

Smart engine 320 may store the extracted keywords in source code keywords DB 330 and/or identify which source code keywords stored in source code keywords DB 330 have been extracted for a particular source code change. Translation engine 340 may map extracted source code keywords to testing keywords and may store the testing keywords in testing keywords DB 350. An exemplary implementation of translation engine 340 is described below with reference to FIG. 4. In other implementations, a different implementation of translation engine 340 may be used. Thus, a knowledge base may be built using these database tools, to store mappings between the keywords and the test cases, and continually improved by improving the mapping information based on the execution of the test case scenarios and the training of neural network models, such as translation engine 340, using AI tools.

Smart engine 320 may identify relevant test cases associated with the source code changes based on the testing keywords stored in testing keywords DB 350 and may identify additional relevant test cases based on a dependency matrix stored in testing keywords DB 350. Test cases may be stored in test cases DB 360. Exemplary information that may be stored in test cases DB 360 is described below with reference to FIG. 5A. Smart engine 420 may provide the identified relevant test cases to test cases injector 370.

Test cases injector 370 may automatically inject the identified relevant test cases into a testing queue associated with the particular application in testing environment 372. Testing environment 372 may simulate an environment for application system 110 and may execute test cases in the simulated environment based on a testing queue. Furthermore, test cases injector 370 may store information identifying the injected test cases in testing history DB 375. Exemplary information that may be stored in testing history DB 375 is described below with reference to FIG. 5B.

Code coverage tool 380 may measure the code coverage associated with a set of injected test cases. Code coverage tool 380 may, for a particular test case, determine which particular lines of code, branches of conditional statements, methods, classes, objects, etc. were tested during a particular test and/or may provide a summary that indicates a percentage of code coverage of particular types, such as source code lines, instruction branches, methods, method complexity, classes or other objects, etc. For example, if the source code is written in Java, code coverage tool 380 may generate a Java agent that executes bytecode, generated from the source code, in a Java Virtual Machine and records each instruction of the bytecode that is executed during the test. Smart engine 420 may update the relevant test cases associated with the source code changes based on the code coverage results obtained from code coverage tool 380.

Smart engine 320 may determine if the code coverage was sufficient for the obtained source code changes based on a code coverage criterion. If the code coverage was not sufficient, smart engine 320 may select one or more additional relevant test cases, by, for example, extracting additional source code keywords from source code changes DB 315, identifying additional test cases based on information stored in testing history DB 375, obtaining additional test cases from an administrator, attempting to select additional test cases from test cases DB 360 using random sampling, and/or select additional test cases using another type of technique.

In some implementation, smart engine 320 may update the relevant test cases based on information stored in policy DB 390. Policy DB 390 may store a set of policies for smart engine 320 determined based on reinforcement learning. For example, policy DB 390 may store a set of policies associated with different states of testing environment 372. Each state may be defined by parameters that include the identified source code changes, the extracted source code keywords, the mapped testing keywords, the identified relevant test cases, the obtained code coverage results, and/or other types of parameters. For each state, policy DB 390 may include information identifying actions performed by smart engine 320 in the past and an associated reward value, and/or potential actions to be taken and associated expected reward values. Reward values may be based on, for example, the degree of code coverage obtained or expected to be obtained. The actions to be taken may include, for example, actions to select additional test cases based on one or more criteria, such as the criteria identified above. Smart engine 320 may be configured to act to maximize a value function that represents the reward values obtained over a period of time.

Furthermore, smart engine 320 may perform other types of updates based on the code coverage information. For example, smart engine 320 may update a dependency matrix for the test cases by identifying source code that was tested in addition to source code associated with the source code changes. Smart engine 320 may identify lines of code that were tested but not associated with source code changes, may extract source code keywords from the tested lines of code, may map the extracted source code keywords to testing keywords, and may identify test cases associated with the testing keywords. Smart engine 320 may designate one or more of the identified test cases as being dependent on one or more of the injected test cases.

Although FIG. 3 shows exemplary components of testing system 140, in other implementations, testing system 140 may include fewer components, different components, additional components, or differently arranged components than depicted in FIG. 3. Additionally or alternatively, one or more components of testing system 140 may perform one or more tasks described as being performed by one or more other components of testing system 140. For example, different test cases DBs 360 may be included for different applications.

Figure 4:
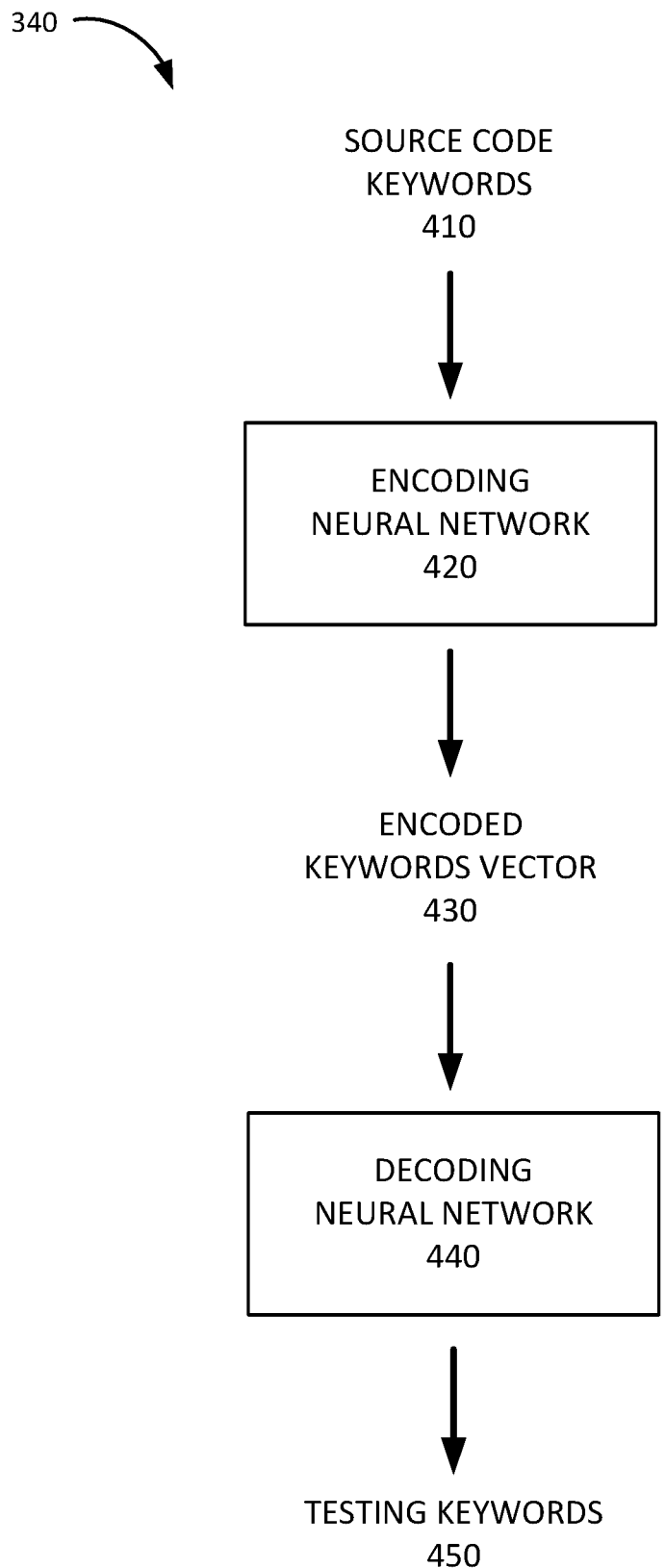
FIG. 4 is a diagram illustrating exemplary functional components of the translation engine of FIG. 3 according to an implementation described herein.

FIG. 4 is a diagram illustrating exemplary functional components of translation engine 340. As shown in FIG. 4, translation engine may include an encoding neural network 420 and a decoding neural network 440.

Encoding neural network 410 may take as input a set of source code keywords 410 and may generate as output an encoded keywords vector 430. Thus, encoding neural network 410 may map the set of source code keywords 410 into a feature space of keyword "sentences" in which a particular set of source code keywords 410 is represented as an encoded vector in the feature space. Each of the elements of the encoded vector may include a numerical value for a particular dimension of the feature space. The number of dimensions of the feature space may be based on the number of neurons in the output layer of encoding neural network 410 and may be empirically determined. Decoding neural network 440 may take as input encoded keywords vector 430 and may generate as output a set of testing keywords 450.

Thus, even though the source code keywords used by developers may be different from the testing keywords used by testers that write test cases, a set of source code keywords may represent a particular concept or "sentence" similar to a concept or "sentence" represented by a set of testing keywords, and similar concepts may be close to each other in the feature space. Even though a particular set of source code keywords map to a point in the feature space not directly associated with a set of testing keywords, decoding neural network 440 may identify a set of keywords associated with another point in the feature space that is closest to the mapped point, and may, therefore, identify a set of testing keywords that is closest in meaning to the particular set of testing keywords.

Encoding neural network 420 and/or decoding neural network 440 may be implemented as a Recurrent Neural Network (RNN), a Long Short Term Memory (LSTM) neural network, an Attention Mechanism neural network, a Neural Turing Machine, and/or another type of neural network. Encoding neural network 420 and/or decoding neural network 440 may be trained using a manually generated training set of parallel corpora that matches sets of source code keywords to sets of testing keywords. Additionally or alternatively, encoding neural network 420 and/or decoding neural network 440 may be trained using information stored in testing history DB 375 using the obtained code coverage, associated with a set of source code keywords and a set of testing keywords for a set of injected test cases, as validation data.

For example, during training, encoding neural network 420 may take as input a set of source code change keywords and output an encoded vector in the feature space using a randomly initialized set of weights. Decoding neural network 440 may then decode the encoded vector into a set of testing keywords also using a randomly initialized set of weights. The generated testing keywords may be compared to the set of testing keywords, associated with the input of source code change keywords in the training set parallel corpora, to generate an error between the generated testing keywords and the set of testing keywords in the training set. Decoding neural network 440 and encoding neural network 420 may then be trained using backpropagation to adjust the weights to reduce the error. Training may be performed until the error between the generated testing keywords and the testing keywords in the training set is below an error threshold.

In some implementations, encoding neural network 420 and decoding neural network 440 may be implemented using one or more computation libraries for implementing training of neural networks, such as, for example, TensorFlow, Theano, Torch, Caffe, MXNet, etc. In other implementations, encoding neural network 420 and decoding neural network 440 may be implemented using a different technique.

When a new source code keyword is added to source code keyword DB 330, encoding neural network 420 may be retrained by adding a node to an input layer associated with encoding neural network 420 and using the trained weights as the initial weights for the training. After encoding neural network 420 is retrained with the new source code keyword included, decoding neural network 440 may be retrained using the retrained encoding neural network 420. If a new testing keyword is added to testing keywords DB 350, decoding neural network 440 may be retrained by adding a node to an output layer associated with decoding neural network 440 and using the trained weights as the initial weights for the training.

Although FIG. 4 shows exemplary components of translation engine 340, in other implementations, translation engine 340 may include fewer components, different components, additional components, or differently arranged components than depicted in FIG. 4. Additionally or alternatively, one or more components of translation engine 340 may perform one or more tasks described as being performed by one or more other components of translation engine 340.

Figure 5A:
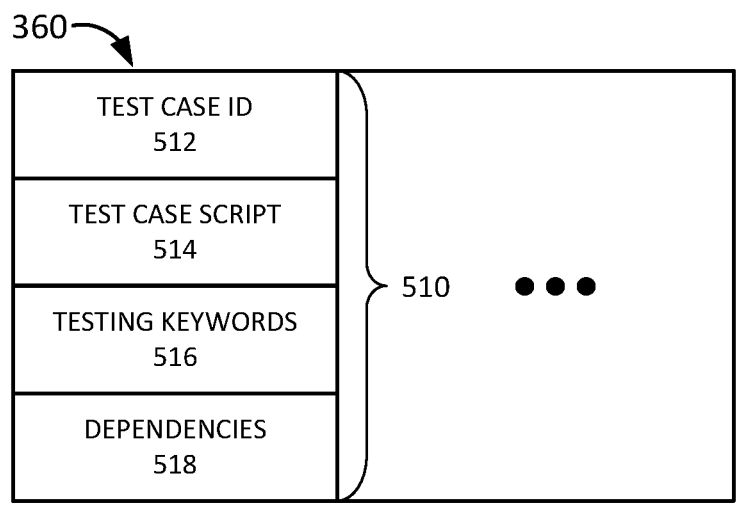
FIG. 5A is a diagram illustrating exemplary components of the test cases database of FIG. 3 according to an implementation described herein.

FIG. 5A is a diagram illustrating exemplary components of test cases DB 360. As shown in FIG. 5A, test cases DB 360 may include one or more test cases record 510. Each test case record 510 may store information associated with a particular test case. Test case record 510 may include a test case identifier (ID) field 512, a test case script field 514, a testing keywords field 516, and a dependencies field 518.

Test case ID field 512 may include an identifier that uniquely identifies the particular test case. Furthermore, test case ID field 512 may include a description of the particular test case. The description may specify, for example, a particular set of packages, functions, interfaces, conditions, inputs, and/or other types of parameters that are to be tested with respect to the particular application. Test case script field 514 may include a set of instructions to be executed to carry out the test case. The script may specify particular actions that are to be performed on particular test objects associated with the particular application. For example, if the application includes an interface with a clickable button and a text box, the script may specify that a test object button be clicked or that a particular input string be entered into a test object text input box.

Testing keywords field 516 may store one or more testing keywords associated with the particular test case. The testing keywords may be generated manually by an operator when a test case is designed. Additionally or alternatively, the testing keywords may be extracted automatically by smart engine 320 from the test case ID, the test case description, and/or test case script and stored in testing keywords field 516.

Dependencies field 518 may store information identifying one or more other test cases that are dependent on the particular test case. Thus, if the particular test case is injected into a testing queue, smart engine 320 may select to inject all the test cases identified in dependencies field 518 of test case record 510 associated with the particular test case. Thus, dependencies fields 518 of test case records 510 in test cases DB 510 may form a dependency matrix for the test cases. The dependencies may be generated manually by an operator when a test case is designed. Additionally or alternatively, the dependencies may be generated automatically by smart engine 320 based on code coverage information associated with an injected test case. For example, smart engine 320 may identify additional lines of code that were tested when the injected test case was run based on obtained code coverage information, may extract source code keywords from the tested lines of code, may map the extracted source code keywords to testing keywords, and may identify test cases associated with the testing keywords. Smart engine 320 may designate one or more of the identified test cases as being dependent on one or more of the injected test cases.

Although FIG. 5A shows exemplary components of test cases DB 360, in other implementations, test cases DB 360 may include fewer components, different components, additional components, or differently arranged components than depicted in FIG. 5A.

Figure 5B:
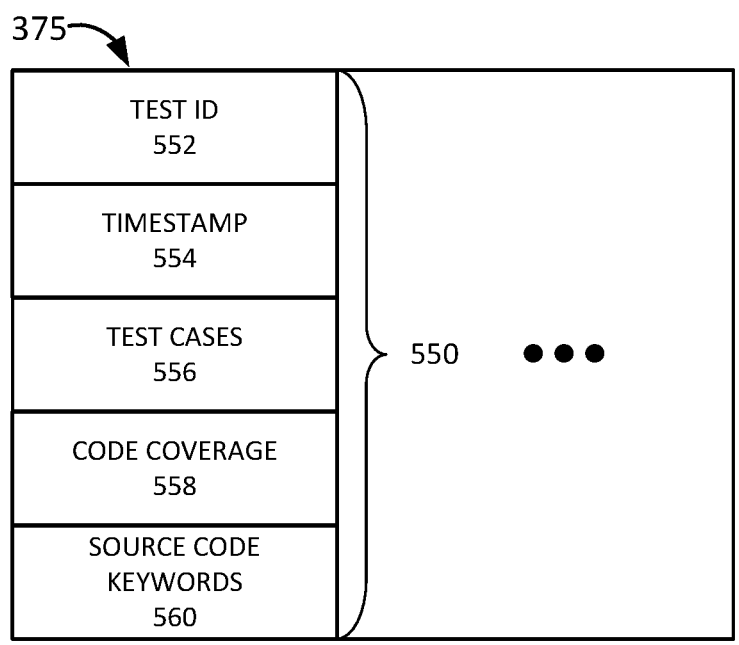
FIG. 5B is a diagram illustrating exemplary components of the testing history database of FIG. 3 according to an implementation described herein.

FIG. 5B is a diagram illustrating exemplary components of testing history DB 375. As shown in FIG. 5B, testing history DB 375 may include one or more testing history record 550. Each testing history record 550 may store information associated with a particular testing history event. Testing history record 550 may include a test ID field 552, a timestamp field 554, a test cases field 556, a code coverage field 558, and a source code keywords field 560.

Test ID field 552 may include an ID that uniquely identifies the particular testing history event. Timestamp field 554 may include one or more timestamps associated with the particular testing history event, such as, for example, a timestamp for generating the particular testing history event, a timestamp for starting the particular testing history event, and/or a timestamp for ending the particular testing history event.

Test cases field 556 may store information identifying one or more test cases associated with the particular testing history event. For example, test cases field 556 may store test case IDs associated with test case records 510 for test cases that were run during the particular testing history event. Code coverage field 558 may include information identifying code coverage information associated with the particular testing history event. For example, code coverage field 558 may identify which lines of code were executed during the particular testing history event. Source code keywords field 560 may identify one or more source code keywords associated with the source code executed during the particular testing history event and identified in code coverage field 558. The source code keywords stored in source code keywords field 560 may be used to identify test cases relevant to a particular source code keyword when selecting test cases to inject for a particular source code change to be tested.

Although FIG. 5B shows exemplary components of testing history DB 375, in other implementations, testing history DB 375 may include fewer components, different components, additional components, or differently arranged components than depicted in FIG. 5B.

Figure 6:
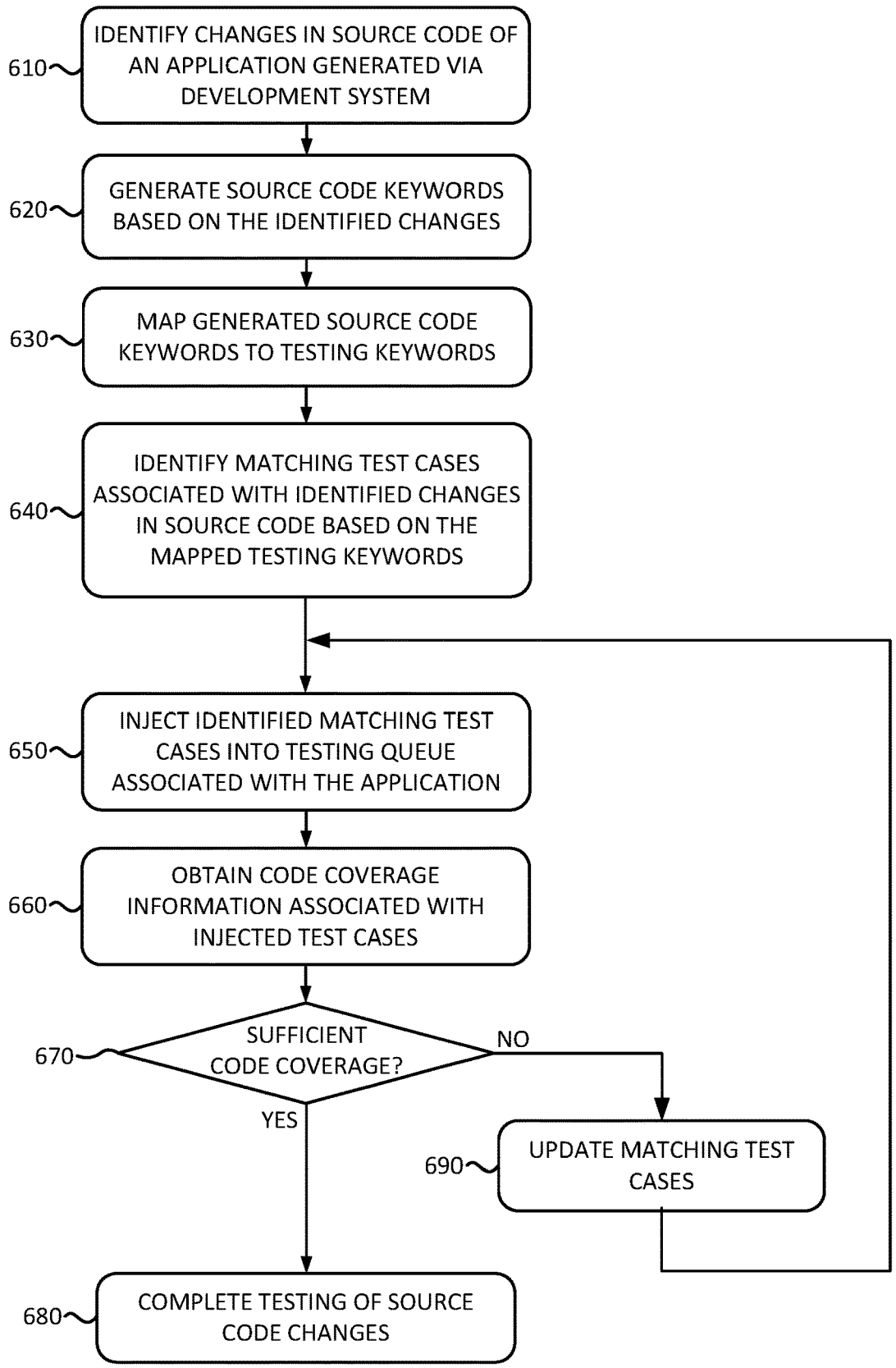
FIG. 6 is a flowchart of a process for automatic injection of test cases according to an implementation described herein.

FIG. 6 is a flowchart of a process for automatic injection of test cases according to an implementation described herein. In some implementations, the process of FIG. 6 may be performed by testing system 140. In other implementations, some or all of the process of FIG. 6 may be performed by another device or a group of devices separate from testing system 140.

The process of FIG. 6 may include identifying changes in source code for an application generated via development system 130 (block 610). For example, development system interface 310 may obtain source code changes from development system 130 and store the source code changes in source code changes DB 315.

The process of FIG. 6 may further include generating source code keywords based on the identified changes (block 620), mapping the generated source code keywords to testing keywords (block 630), and identifying matching test cases associated with the identified changes in the source code based on the mapped testing keywords (block 640). For example, smart engine 320 may extract source code keywords from comments, file names, variable names, function names, and/or other types of entities associated with the source code changes and may indicate to translation engine 340 which source code keywords from source code keywords DB 330 to use as input in the mapping process. Translation engine 340 may map the extracted source code keywords to testing keywords and may indicate to smart engine 320 which testing keywords from testing keywords DB 350 to use in identifying relevant test cases for the identified source code changes. Smart engine 320 may use the mapped testing keywords to identify test cases in test cases DB 360 associated with the mapped testing keywords.

The identified matching test cases may be injected into the testing queue associated with the application (block 650) and code coverage information associated with the injected test cases may be obtained (block 660). For example, smart engine 320 may provide the identified test cases to test cases injector 370 and test cases injector 370 may inject the identified test cases into a testing queue associated with the application in testing environment 372. Thus, the testing scripts associated with the identified test cases may be executed one by one. Code coverage tool 380 may keep track of which lines, conditional branches, functions, etc. of the source code are executed and may generate a code coverage report once the injected test cases are executed.

A determination may be made if sufficient code coverage has been obtained (block 670). For example, smart engine 320 may determine whether the obtained code coverage satisfied a particular code coverage criterion, such as a percentage of executed source code lines associated with the changes in source code. If it is determined that sufficient code coverage has been obtained (block 670—YES), the testing of source code changes may be completed (block 680). For example, smart engine 320 may indicate to development system 130 that testing has been completed and that the source code changes may be implemented. In response, development system 130 may deploy a version of the application with the implemented source code changes to application system 110. Thus, a deployed instance of the application may be updated on application system 110 to include the changes in the source code, based on determining that the injected test cases sufficiently tested the changes in the source code.

If it is determined that sufficient code coverage has not been obtained (block 670—NO), the matching test cases may be updated (block 690). Smart engine 320 may update the matching test cases using one or more techniques. Exemplary techniques that may be used by smart engine 320 to identify additional matching test cases are described below with reference to FIG. 7. After identifying one or more additional test cases, processing may return to block 650 to inject the additional identified test cases into the testing queue and to obtain code coverage information for the additional identified test cases. Blocks 650, 660, 670, and 690 may be repeated until the code coverage criterion is satisfied.

Figure 7:
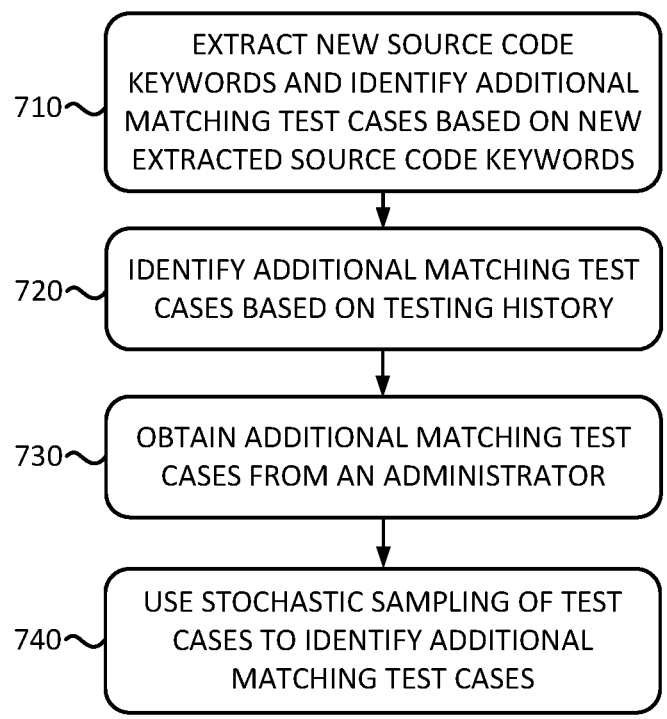
FIG. 7 is a flowchart of a process for updating identified matching test cases according to an implementation described herein.

FIG. 7 is a flowchart of a process for updating matching test cases according to an implementation described herein. In some implementations, the process of FIG. 7 may be performed by testing system 140. In other implementations, some or all of the process of FIG. 7 may be performed by another device or a group of devices separate from testing system 140.

The process of FIG. 7 may include extracting new source code keywords and identifying additional matching test cases based on the new extracted source code keywords (block 710). For example, in some implementations, smart engine 320 may identify untested changes in the source code based on the obtained code coverage information, identify a new source code keyword based on the untested changes in the source code of the application, generate an updated list of source code keywords that include the new source code keyword, map the updated list of source code keywords to an updated list of testing keywords, select one or more additional test cases based on the updated list of testing keywords, and inject the selected one or more additional test cases into the testing queue.

The process of FIG. 7 may further include identifying additional matching test cases based on testing history (block 720). For example, in some implementations, smart engine 320 may identify untested changes in the source code based on the obtained code coverage information, select one or more additional test cases associated with the untested changed by accessing testing history DB 375, and inject the selected one or more additional test cases into the testing queue. Furthermore, smart engine 320 may update translation engine 340 based on the testing keywords associated with the additional test cases selected from testing history DB 375.

The process of FIG. 7 may further include obtaining additional matching test cases from an administrator (block 730). For example, in some implementations, smart engine 320 may alert an administrator that the obtained code coverage information does not satisfy the code coverage criterion, receive one or more additional test cases associated with changes in the source code from the administrator, and inject the received one or more additional test cases into the testing queue. Furthermore, smart engine 320 may update translation engine 340 based on the testing keywords associated with the additional test cases received from the administrator.

The process of FIG. 7 may further include using stochastic sampling of test cases to identify additional matching test cases (block 740). For example, in some implementations, smart engine 320 may use stochastic sampling, such as a Monte Carlo method, to randomly select test cases from test cases DB 360, in an attempt to increase the code coverage. If smart engine 320 successfully increases the code coverage, smart engine 320 may update translation engine 340 based on the testing keywords associated with the additional test cases selected using stochastic sampling.

Figure 8:
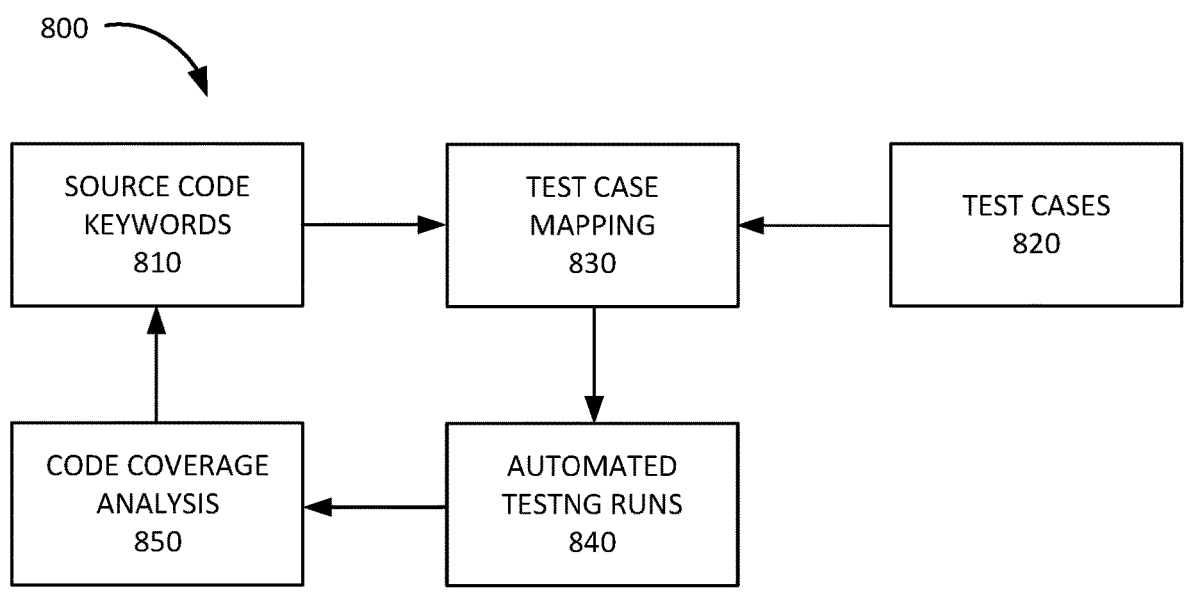
FIG. 8 is a diagram illustrating an overview of the process for automatic injection of test cases according to an implementation described herein.

FIG. 8 is a diagram 800 illustrating an overview of the process for automatic injection of test cases. As shown in FIG. 8, diagram 800 includes source code keywords 810, test cases 820, test case mapping 830, automated testing runs 840, and code coverage analysis 850. Source code keywords 810 may be extracted from difference files generated between a previous source code file version and a new source code file version with proposed changes. Source code keywords 810 may be stored in source code keywords DB 330. Test cases 820 may be obtained from test cases DB 360 and test mapping 830 may be performed to identify relevant test cases based on the source code keywords 810. For example, translation engine 420 may map source code keywords 810 to testing keywords and then identify test cases that match the mapped testing keywords.

The test cases identified as relevant through test case mapping 830 may be injected into automated testing runs 840. For example, test cases injector 370 may inject the test cases into testing environment 372. The results of automated testing runs 840 may be analyzed using code coverage analysis 850. For example, if the source code corresponds to Java source code, for example, testing environment 372 may be implemented as a set of Java Virtual Machines and code coverage analysis 850 may be performed using a Jacoco code coverage tool.

After code coverage analysis 850 is performed, source code keywords 810 may be updated if insufficient code coverage is obtained during the automated testing runs 840 based on the test case mapping 830. Thus, additional source code keywords 810 may be extracted from the difference files. As an example, terms that appeared fewer times than a previously used threshold in the source code changes may be selected as keywords. As another example, additional named entity corpora and/or dictionaries may be selected and used to identify keywords. As yet another example, additional keywords may be selected manually. Additionally or alternatively, the process of FIG. 7 may be used to identify additional matching test cases. Blocks 830, 840, 850, and 810 may then be repeated until sufficient code coverage is obtained.

Figure 9A:
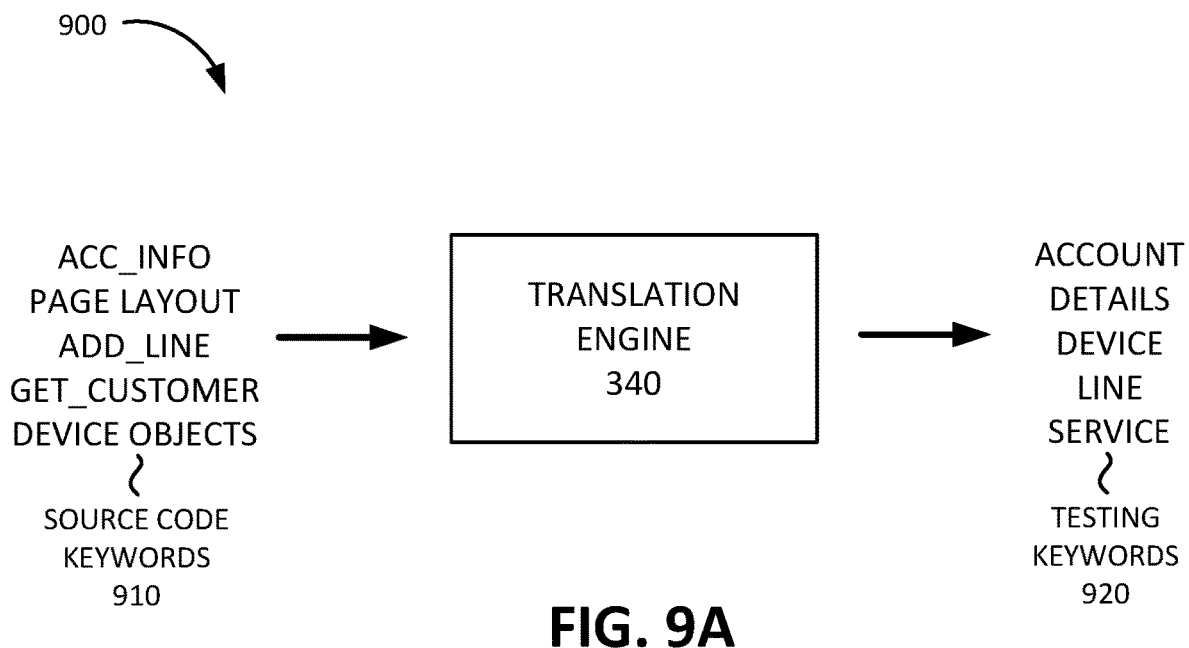
FIGS. 9A-9D are diagrams illustrating an exemplary automatic injection of test cases according to an implementation described herein.
Figure 9B:
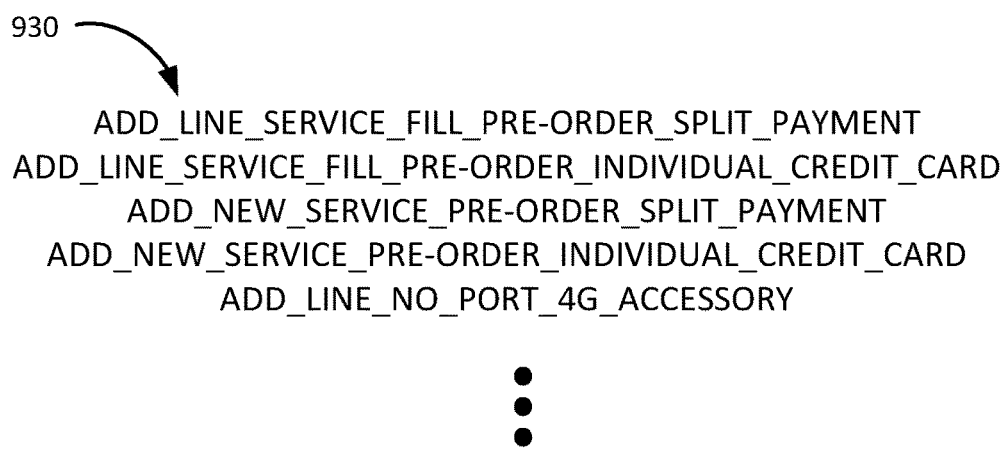
Figure 9C:
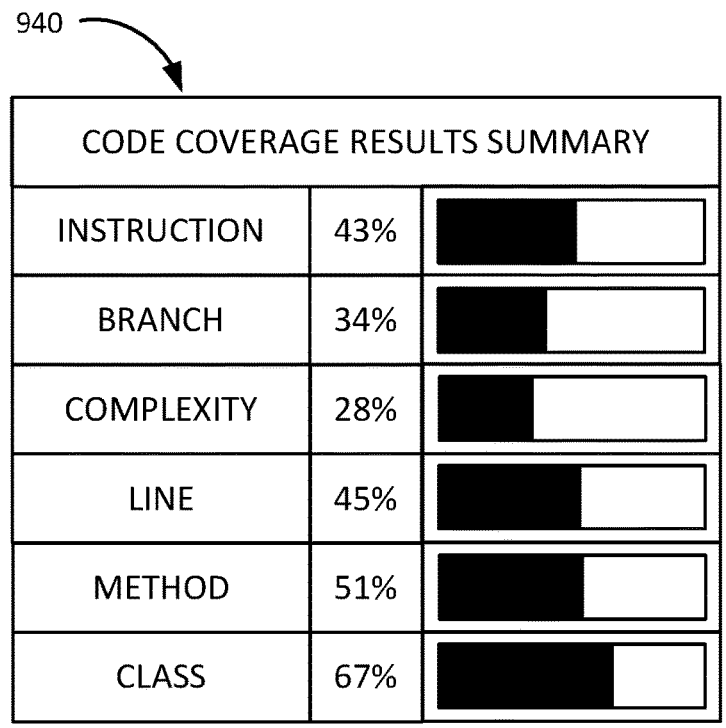

FIGS. 9A-9D are diagrams illustrating an exemplary automatic injection of test cases according to an implementation described herein. FIG. 9A illustrates a mapping 900 from a set of source code keywords 910 to a set of testing keywords 920 performed by translation engine 340. FIG. 9B illustrates a set of test cases 930 (identified by test case IDs) associated with the set of testing keywords 920. Test cases 930 may be injected into a testing queue associated with an application and run in testing environment 372. FIG. 9C illustrates a code coverage summary report 940 generated by code coverage tool 380 based on the execution of the injected test cases. Code coverage summary report 940 may indicate insufficient code coverage. In response, smart engine 320 may identify additional test cases in order to increase the code coverage. For example, smart engine 320 may identify source code changes that were not covered during the execution of the injected test cases and may extract additional source code keywords, from the identified untested source code changes, which were not previously extracted.

Figure 9D:
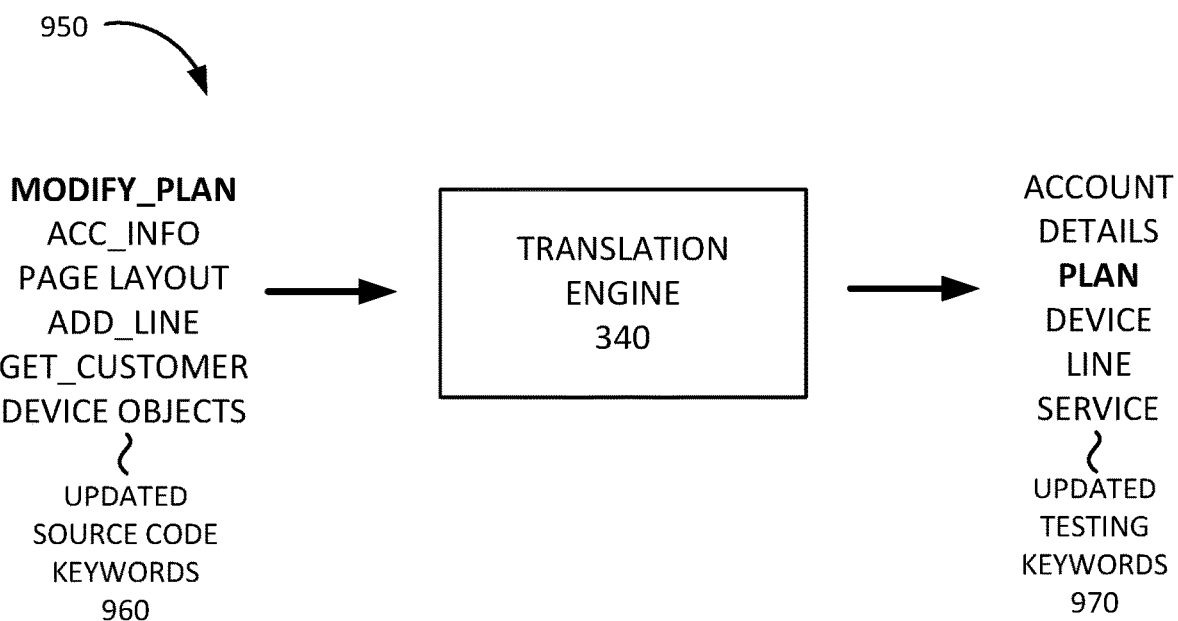

FIG. 9D illustrates a mapping 950 from a set of updated source code keywords 960 to a set of updated testing keywords 970 performed by translation engine 340. The set of updated testing keywords 970 may be used to identify additional test cases to be injected in order to increase the code coverage. After sufficient code coverage is obtained, the source code changes may be approved for deployment and deployment system 130 may deploy a new version of the application on application system 110.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6 and 7, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code--it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
    identifying, by the computer device, changes in source code of an application;
    generating, by the computer device, a plurality of source code keywords based on the identified changes in the source code;
    mapping, by the computer device, the generated plurality of source code keywords to a plurality of testing keywords using at least one neural network trained using backpropagation on a training set that matches sets of source code keywords to sets of testing keywords, wherein mapping the generated plurality of source code keywords to the plurality of testing keywords using the at least one neural network includes:
        encoding the plurality of source code keywords into an encoded keywords vector using an encoding neural network; and
        decoding the encoded keywords vector into the plurality of testing keywords using a decoding neural network;
    identifying, by the computer device, a plurality of test cases from a test cases database based on the plurality of testing keywords;
    injecting, by the computer device, the plurality of test cases into a testing queue of a testing system associated with the application;
    determining, by the computer device, whether the injected plurality of test cases satisfy a code coverage criterion in the source code; and
    updating a deployed instance of the application to include the changes in the source code, based on determining that the injected plurality of test cases satisfy the code coverage criterion in the source code.

2. The method of claim 1, wherein generating the plurality of source code keywords includes generating a source code keyword based on at least one of:
    a comment associated with the source code,
    a file name associated with the source code,
    a variable name associated with the source code, or
    a function associated with the source code.

3. The method of claim 1, further comprising:
    identifying a new source code keyword;
    retraining the encoding neural network using the new source code keyword; and
    retraining the decoding neural network using a retrained encoding neural network.

4. The method of claim 1, wherein identifying a plurality of test cases from a test cases database based on the plurality of testing keywords includes:
    identifying one or more additional test cases which depend on a particular one of the plurality of test cases, based on a dependency matrix associated with the test cases database.

5. The method of claim 1, wherein determining whether the injected plurality of test cases satisfy the code coverage criterion in the source code includes:
    obtaining code coverage information for the changes in the source code associated with the injected plurality test cases; and
    determining whether the obtained code coverage information satisfies the code coverage criterion.

6. The method of claim 5, further comprising:
    determining that the obtained code coverage information does not satisfy the code coverage criterion; and
    updating the identified plurality of test cases, based on determining that the obtained code coverage information does not satisfy the code coverage criterion.

7. The method of claim 6, wherein updating the identified plurality of test cases includes:
    identifying untested changes in the source code based on the obtained code coverage information;
    identifying a new source code keyword based on the untested changes in the source code of the application;
    generating an updated plurality of source code keywords based on the identified new code keyword;
    mapping the updated plurality of source code keywords to an updated plurality of testing keywords using the at least one neural network;
    selecting one or more additional test cases based on the updated plurality of testing keywords; and
    injecting the selected one or more additional test cases into the testing queue.

8. The method of claim 6, wherein updating the identified plurality of test cases includes:
    identifying untested changes in the source code based on the obtained code coverage information;
    selecting one or more additional test cases associated with the untested changed by accessing a testing history database; and
    injecting the selected one or more additional test cases into the testing queue.

9. The method of claim 6, wherein updating the identified plurality of test cases includes:
    outputting an alert that the obtained code coverage information does not satisfy the code coverage criterion;
    receiving one or more additional test cases associated with changes in the source code;

injecting the received one or more additional test cases into the testing queue; and updating a translation engine that maps code keywords to testing keywords based on the received one or more additional test cases.

10. The method of claim 6, further comprising:
identifying a new source code keyword based on the obtained code coverage information;
generating an updated plurality of source code keywords based on the identified new code keyword;
mapping the updated plurality of source code keywords to an updated plurality of testing keywords;
identifying one or more additional test cases based on the updated plurality of testing keywords; and
updating a dependency matrix based on the identified one or more additional test cases.

11. A computer device comprising:
a memory configured to store instructions; and
a processor configured to execute the instructions to:
identify changes in source code of an application;
generate a plurality of source code keywords based on the identified changes in the source code;
map the generated plurality of source code keywords to a plurality of testing keywords using at least one neural network trained using backpropagation on a training set that matches sets of source code keywords to sets of testing keywords, wherein, when mapping the generated plurality of source code keywords to the plurality of testing keywords using the at least one neural network, the processor is further configured to:
encode the plurality of source code keywords into an encoded keywords vector using an encoding neural network; and
decode the encoded keywords vector into the plurality of testing keywords using a decoding neural network;
identify a plurality of test cases from a test cases database based on the plurality of testing keywords; and
inject the plurality of test cases into a testing queue of a testing system associated with the application:
determine whether the injected plurality of test cases satisfy a code coverage criterion in the source code; and
update a deployed instance of the application to include the changes in the source code, based on determining that the injected plurality of test cases satisfy the code coverage criterion in the source code.

12. The computer device of claim 11, wherein, when identifying a plurality of test cases from a test cases database based on the plurality of testing keywords, the processor is further configured to:
identify one or more additional test cases which depend on a particular one of the plurality of test cases, based on a dependency matrix associated with the test cases database.

13. The computer device of claim 11, wherein, when determining whether the injected plurality of test cases satisfy the code coverage criterion in the source code, the processor is further configured to:
obtain code coverage information for the changes in the source code associated with the injected plurality test cases; and
determine whether the obtained code coverage information satisfies the code coverage criterion.

14. The computer device of claim 13, wherein the processor is further configured to:

determine that the obtained code coverage information does not satisfy the code coverage criterion; and
update the identified plurality of test cases, based on determining that the obtained code coverage information does not satisfy the code coverage criterion.

15. The computer device of claim 14, wherein, when updating the identified plurality of test cases, the processor is further configured to:
identify untested changes in the source code based on the obtained code coverage information;
identify a new source code keyword based on the untested changes in the source code of the application;
generate an updated plurality of source code keywords based on the identified new code keyword;
map the updated plurality of source code keywords to an updated plurality of testing keywords using the at least one neural network;
select one or more additional test cases based on the updated plurality of testing keywords; and
inject the selected one or more additional test cases into the testing queue.

16. The computer device of claim 14, wherein, when updating the identified plurality of test cases, the processor is further configured to:
identify untested changes in the source code based on the obtained code coverage information;
select one or more additional test cases associated with the untested changed by accessing a testing history database; and
inject the selected one or more additional test cases into the testing queue.

17. The computer device of claim 14, wherein, when updating the identified plurality of test cases, the processor is further configured to:
alert an administrator that the obtained code coverage information does not satisfy the code coverage criterion;
receive one or more additional test cases associated with changes in the source code from the administrator;
inject the received one or more additional test cases into the testing queue; and
update a translation engine that maps code keywords to testing keywords based on the received one or more additional test cases.

18. A non-transitory computer-readable memory device storing instructions executable by a process, the non-transitory computer-readable memory device comprising:
one or more instructions to identify changes in source code of an application;
one or more instructions to generate a plurality of source code keywords based on the identified changes in the source code;
one or more instructions to map the generated plurality of source code keywords to a plurality of testing keywords using at least one neural network trained using backpropagation on a training set that matches sets of source code keywords to sets of testing keywords, wherein the one or more instructions to map the generated plurality of source code keywords to the plurality of testing keywords using the at least one neural network further include:
one or more instructions to encode the plurality of source code keywords into an encoded keywords vector using an encoding neural network; and
one or more instructions to decode the encoded keywords vector into the plurality of testing keywords using a decoding neural network;

one or more instructions to identify a plurality of test cases from a test cases database based on the plurality of testing keywords;

one or more instructions to inject the plurality of test cases into a testing queue of a testing system associated with the application;

one or more instructions to determine whether the injected plurality of test cases satisfy a code coverage criterion in the source code; and one or more instructions to update a deployed instance of the application to include the changes in the source code, based on determining that the injected plurality of test cases satisfy the code coverage criterion in the source code.

19. The non-transitory computer-readable memory device of claim 18, wherein the one or more instructions to generate the plurality of source code keywords includes one or more instructions to generate a source code keyword based on at least one of:
- a comment associated with the source code,
- a file name associated with the source code,
- a variable name associated with the source code, or
- a function associated with the source code.

20. The non-transitory computer-readable memory device of claim 18, wherein the one or more instructions to determine whether the injected plurality of test cases satisfy the code coverage criterion in the source code further include:

one or more instructions to obtain code coverage information for the changes in the source code associated with the injected plurality test cases; and one or more instructions to determine whether the obtained code coverage information satisfies the code coverage criterion.

* * * * *